May 9, 1967 K. R. BOYDELL 3,318,092
HYDRAULIC APPARATUS

Filed July 7, 1965 3 Sheets-Sheet 1

INVENTOR
Kenneth R. Boydell
BY
Orland M. Christensen
ATTORNEY

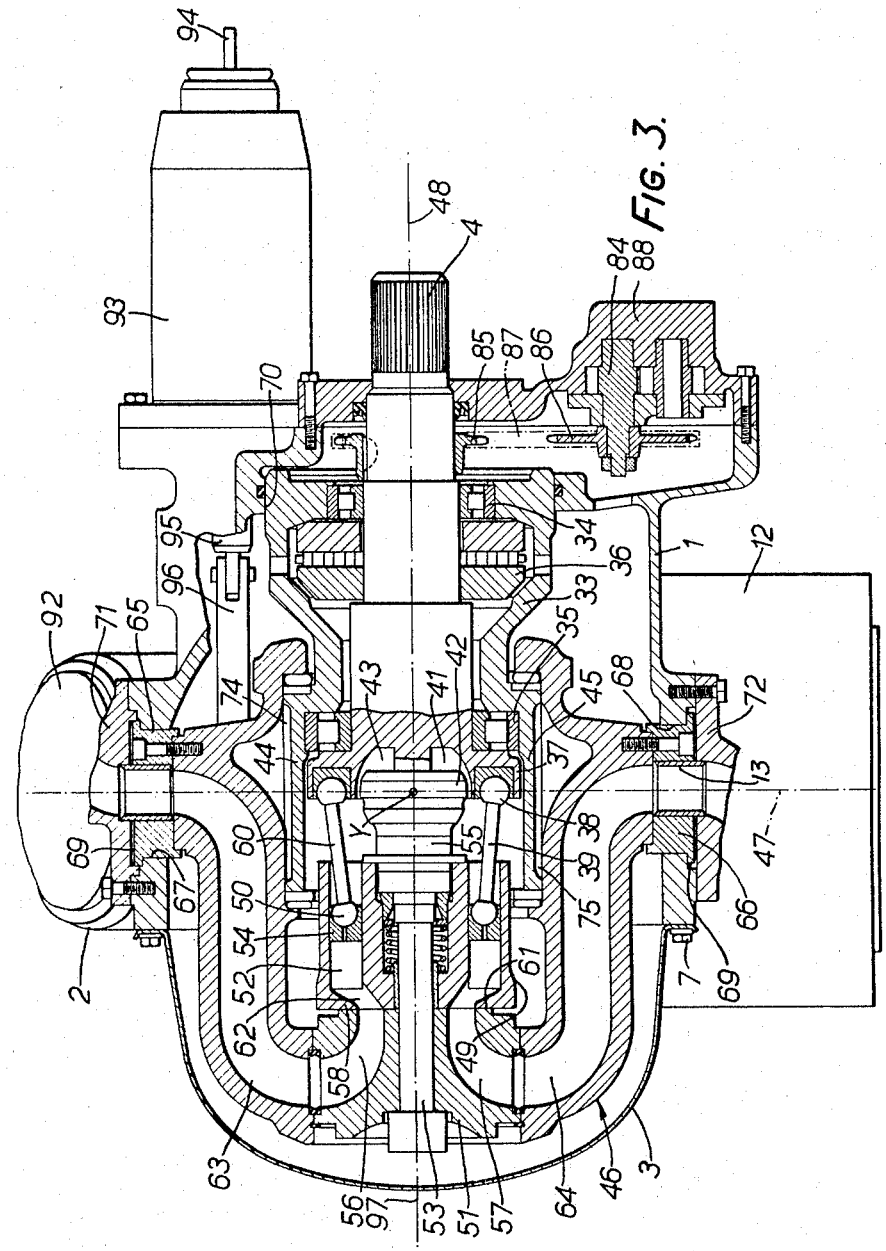

United States Patent Office 3,318,092
Patented May 9, 1967

3,318,092
HYDRAULIC APPARATUS
Kenneth R. Boydell, Bredons Hardwicke, near Tewkesbury, England, assignor to Dowty Technical Developments Limited, Cheltenham, England, a British company
Filed July 7, 1965, Ser. No. 470,026
Claims priority, application Great Britain, July 10, 1964, 28,519/64
5 Claims. (Cl. 60—53)

This invention relates to a hydrostatic power transmission incorporating a hydraulic pump and a hydraulic motor of the tilt head kind, hydraulically connected together.

A pump or motor unit of the tilt head kind comprises a drive shaft suitably mounted in a bearing housing for rotation and a tilt head inclined or inclinable to the shaft axis so that a central axis through the tilt head intersects the drive shaft axis, the head containing cylinders having pistons reciprocable therein by rotation of the shaft, such that the piston stroke depends on the inclination between the head axis and the shaft axis. The head may be so arranged that it is smoothly adjustable in its inclination relatively to the drive shaft to provide smooth variation of the displacement of the unit. A pump or motor unit of this kind will be referred to as a tilt head pump unit or a tilt head motor unit.

The object of the present invention is to provide a compact hydrostatic power transmission incorporating a tilt head pump unit and a tilt head motor unit.

In accordance with the present invention a hydrostatic power transmission comprises a tilt head pump unit and a tilt head motor unit mounted together with the bearing housings of the pump unit and the motor unit in fixed relation to one another, such that a common plane passing through the drive shaft and head axes of one unit intersects at right angles or nearly so to the common plane passing through the drive shaft and head axes of the other unit, the line of intersection of these two planes either intersecting or passing close to the point of intersection for each unit of the drive shaft axis and head axis.

The tilt head of one unit may be mounted at a fixed inclination to its drive shaft axis and the other unit may be mounted to extend within the obtuse angle between the drive shaft and head axes of the one unit.

A casing may be provided within which the other unit and the bearing housing of the one tilt head unit are mounted, an extension from the casing forming part of the tilt head of the one tilt head unit. This extension may be detachably secured to the casing.

Figure 1:
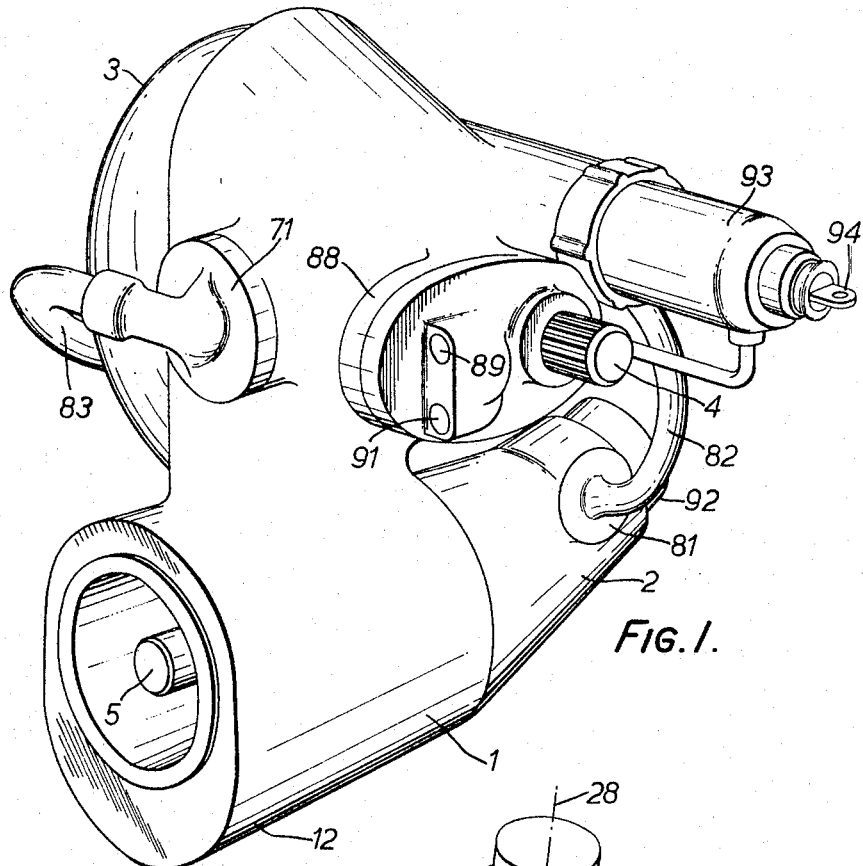
Figure 4:
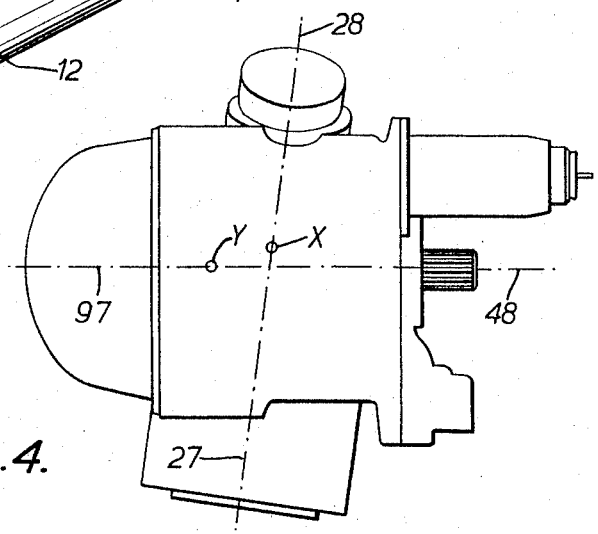
Figure 2:
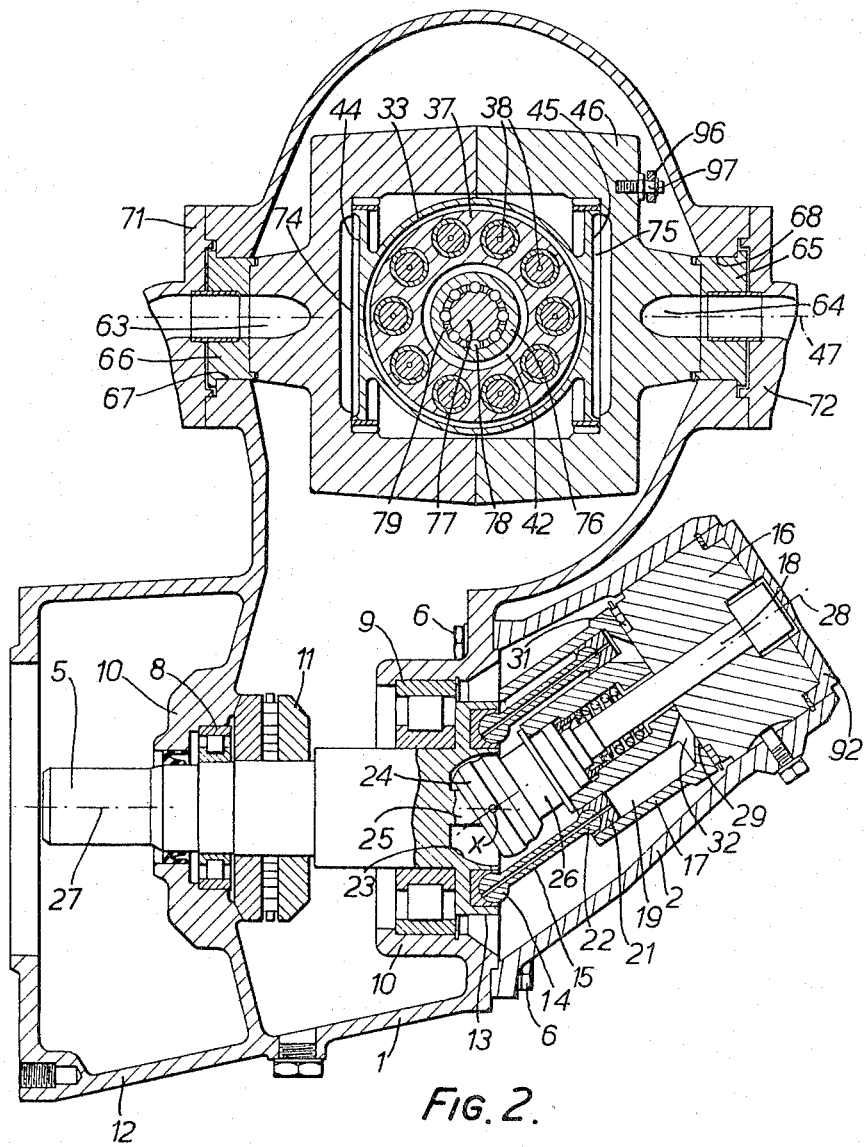

How the invention can be carried into effect is hereinafter particularly described with reference to the accompanying drawings in which, FIGURE 1 is a perspective view of the transmission in accordance with the invention, FIGURE 2 is a cross section through the transmission of FIGURE 1 taken in the plane which includes the drive shaft and head axes of the motor, FIGURE 3 is a cross section through the transmission of FIGURE 1 showing details of the pump, and FIGURE 4 is a plan view of a modified version of the transmission of FIGURES 1, 2 and 3.

The whole transmission is housed in a casing formed in two separable parts 1, and 3. The part 1 forms a major part of the casing and locates the pump and motor drive shafts 4 and 5 respectively for rotation about axes which are relatively fixed. Part 3 forms an inspection cover of the pump and is secured in place by bolts 7. An extension 2 of the casing is secured by bolts 6 to the part 1 and forms part of the tilt head of the motor unit.

Reference is now directed to the lower part of FIGURE 2 which shows the motor in cross section. The shaft 5 is mounted in the casing 1 by two radial thrust roller bearings 8 and 9 and an axial thrust roller bearing 11. The mountings 10 for these bearings form the bearing housing for the shaft 5. The left hand end of the shaft 5 is splined for connection to a suitable socket to receive the drive from the transmission.

The left hand end of the shaft 5 is enclosed within a suitable shroud 12 formed as an extension from the casing part 1 by which the whole transmission may be secured in position for use. The right hand end of the shaft 5 as seen in FIGURE 2 is formed integrally with a drive flange 13 in which are socketed a plurality of connecting rod ball joints 14. A connecting rod 15 extends from each ball joint 14.

The drive flange 13 is located at one end of the casing extension 2. At the other end of the casing extension 2 a valve block 16 is securely fixed and on this block within the casing extension 2 a cylinder barrel 17 is mounted for rotation. The barrel is secured in position on the block by means of a central spindle 18. A plurality of cylinders 19 are formed within the block each parallel to the block rotation axis. Within each cylinder a piston 21 is reciprocably mounted. Each piston 21 is secured by a ball joint 22 to the end of its associated connecting rod 15.

A central recess 23 within the drive flange 13 accommodates a constant velocity universal joint 24. This constant velocity universal joint is of known construction and a similar joint used in the pump will be described later in this Specification. An extension 25 from the drive shaft 5 within the recess 23 forms one driving connection to the universal joint 24. An extension 26 secured to the end of the cylinder barrel 17 remote from the block 16 forms the other driving connection of the universal joint. The function of the universal joint 24 is to ensure that the cylinder barrel rotates in exact synchronism with the drive shaft 5.

The casing extension 2 is arranged to hold the cylinder barrel 17 for rotation about an axis which is inclined to the axis of the shaft 5. The axis of the shaft 5 is indicated in chain dotted lines at 27 and the rotation axis of the cylinder barrel is indicated in chain dotted lines at 28. These axes intersect in the centre of the universal joint 24 at the point marked X. The plane of the cross section as shown in FIGURE 2 includes both of the axes 27 and 28.

The valve block 16 includes a pair of supply and delivery ports of conventional kidney shape, which do not appear in the plane of the section in FIGURE 2. These ports open into the valve surface 29 of the block 16. A flat surface 31 of the block fits accurately on the valve surface 29. A plurality of cylinder ports 32 extending one from each cylinder open into the valve surface 31 for co-operation in conventional manner with the supply and delivery ports in the valve surface 29.

The pump is shown in two different sections in the upper part of FIGURE 2 and in FIGURE 3. The pump shaft 4 is mounted for rotation in a bearing housing 33 which is separate from the casing part 1 but is fixed relatively thereto. Within the bearing housing a shaft is located by a pair of radial thrust roller bearings 34 and 35 and an axial thrust roller bearing 36. The right hand end of the shaft 4 is suitably splined to receive driving power. The left hand end of the shaft 4 is integrally formed with a drive flange 37 around the periphery of which a plurality of ball joints 38 are socketed. A connecting rod 39 extends from each ball joint 38. A central recess 41 within the drive flange encloses a constant velocity universal joint 42. An extension 43 from the drive shaft 4 forms one driving connection of the universal joint 42.

The bearing housing 33 is integrally formed with a pair of trunnions 44 and 45 each in the form of a large diameter disc located one on each side of the drive flange 37. These trunnions are co-axially disposed. The trunnions 44 and 45 support a yoke 46 for tilting movement about an axis indicated in chain dotted lines at 47 which is at right angles to the rotation axis 48 of the drive shaft 4. The yoke 46 is in the form of a casing which surrounds the pump cylinder barrel 49. The cylinder barrel 49 is mounted for rotation on a valve block 51 securely fixed within the yoke 46 by means of a spindle 53 extending from the block 51. The pump cylinder barrel 46 includes a plurality of cylinders 52 extending parallel to the axis of barrel rotation. Within each cylinder 52 a piston 54 is reciprocably mounted and is secured by a ball joint 55 to the end of a connecting rod 56 extending from a ball joint 38 in the drive flange.

The cylinder barrel 49 is rotatably driven from the universal joint 42 by means of an extension 55.

Within the valve block a pair of main ports 56 and 57 open into the valve surface 58 in the conventional kidney form. The barrel rotates with a flat surface 61 thereof in close contact with the valve surface 58. Into the barrel surface 61 a plurality of cylinders 62 open one from each cylinder.

The main ports 56 and 57 connect respectively to passages 63 and 64 which extend in the walls of the yoke 46 up to the position of the trunnion axis 47. The yoke at the position of the trunnion axis 47 is formed with a pair of auxiliary trunnions 65 and 66, one on either side thereof which engage within suitable bores 67 and 68 within the casing part 1. The auxiliary trunnions 65 and 66 each include a flange 69 for engagement with the outer end of the associated bore 67 or 68 to absorb locally end thrust developed due to hydraulic pressure in the auxiliary trunnion. The passages 63 and 64 extend through their respective auxiliary trunnions and make hydraulic connection with pipe connections 71 and 72 which are bolted onto the casing part 1. From each auxiliary trunnion a thin tubular seal 73 extends into the associated pipe connection to ensure leak-free passage of liquid between the pipe connection and the auxiliary trunnions.

The interior of the yoke 46 is formed with a pair of large diameter circular recesses 74 and 75 which engage over the trunnions 44 and 45 by means of needle roller bearings for securing the yoke 46 with bearing housing 33 so that the yoke may move angularly about the tilt axis 47. The bearing housing 33 is received in casing part 1 by sliding engagement in a hole 70 and by the location of the trunnions 44, 45 in the recesses 74 and 75 in the yoke. The yoke itself is located in the casing part 1 by the auxiliary trunnions 65, 66 and both the trunnions and the auxiliary trunnions are co-axially arranged relatively to the tilt axis 47.

The constant velocity universal joint 42 appears in cross section in FIGURE 2. This joint comprises an outer member 76 secured to extension 55 and an inner member 77 secured to the extension 43. The inner member 77 is spherical in shape and the interior surface of the member 76 is also spherical in shape. The member 77 and the interior surface of the member 76 are provided with meridian grooves between which balls 78 engage. The balls 78 are carried in a cage 79 which maintains them in one plane. This kind of universal joint is well known and further description is thought unnecessary. The construction is identical with the construction of the universal joint 24.

There are two hydraulic connections with the valve block 16 of the motor of which one connection 81 is shown in FIGURE 1. From the motor connection 81 a rigid pipe 82 extends to the pump connection 72. A further rigid pipe 83 extends from the connection 71 to the other motor connection which connects to the other main port of the motor valve block 16. The two pipes 82 and 83 connect the pump and the motor together in a closed circuit so that liquid delivered by the pump enters the motor to cause rotation of the motor shaft 5 and return liquid may flow back into the pump. For the purpose of maintaining this transmission primed with liquid, a make-up pump 84 is provided attached to the casing part 1. This pump is driven by sprockets 85 and 86 and a chain 87 from the pump shaft 4. The make-up pump is formed in a cover plate 88 secured by bolts to the casing part 1 and it includes entry and delivery connections 89 and 91 which draw liquid from a suitable reservoir and then deliver it through a filter through a conventional valve system into the transmission. This conventional valve system may be housed in a casing 92 formed on the outer end of the motor valve block 16. The casing parts 1 and 3 and extension 2 are used to collect leakage liquid from the pump and the motor and a connection extends from the casing parts back to the reservoir.

The tilt angle of the yoke 46 about trunnion axis 47 is adjusted by means of a servo motor 93 whose construction is again quite conventional. A control member 94 enters the servo motor and controls the position of the piston rod 95 extending from the opposite end of the servo motor into the casing part 1. From the piston rod 95 a pivotally connected link 96 extends to the yoke, being connected thereto by a pivot pin 97.

In operation the pump drive shaft 4 is connected to an engine or other power source and the motor shaft 5 is connected to a load. When it is desired that the transmission should transmit power the servo motor control member 94 is adjusted to cause the yoke 46 to assume a desired inclined position about the trunnion axis 47 in which the rotation axis of the pump cylinder barrel 49 is inclined to the rotation axis of the pump shaft 4. The shaft 4 and the barrel 49 will rotate synchronously by virtue of the joint 42 and the pistons 54 will reciprocate in their cylinders drawing liquid from one of the passages 63 and 64 and delivering liquid to the other of these passages. The direction of flow of liquid through the passages 63 and 64 will depend on the direction of angular displacement of the yoke 46 about trunnion axis 47 from the zero displacement position in which the pump barrel axis is aligned with the drive shaft axis 48. The liquid flow generated by the pump is connected by the pipes 82 and 83 to the motor valve block 16. The liquid will then have access to the cylinders in such manner that liquid at pressure is supplied to some of the motor cylinders 19 which cause outward movement of their associated pistons 21 to rotate the motor drive shaft 5 and the cylinder barrel 17. By virtue of the valve action between the main ports in the valve block 16 and the cylinder ports 32 the motor will rotate continuously provided that liquid at pressure is supplied from the pump, the direction of rotation being dependent on the direction in which liquid at pressure is supplied from the pump, i.e. depending on the direction of displacement of the pump yoke 46 from its zero displacement position shown in FIGURE 3.

The tilt head of the motor is formed by the casing extension 2, valve block 16 and the cylinder barrel 17, and its central axis 28 is the axis of the cylinder barrel 17. The axis 27 of the motor shaft and the axis 28 of the tilt head intersect at the point X which coincides substantially with the geometric centre of the universal joint 24. The common plane which passes through these two axes is the plane in which the section of FIGURE 2 lies. This plane is arranged to extend through the point Y in the pump centrally of the universal joint 42 at which the drive shaft axis 48 intersects the cylinder barrel axis 97 when the yoke 46 occupies an inclined position. Also the common plane which passes through the axes 48 and 97 when barrel 46 is inclined about its tilt axis is arranged to pass close to the point of intersection of the axes 28 and 27. The plane containing the axes 48 and 97 when referred to FIGURE 2 passes through the centre of the universal joint 42 at right angles to the tilt axis 47 and it will intersect the axis 27 slightly to the left of the point X as seen in FIGURE 2.

Within the scope of the present invention the line of intersection of these two common planes may either intersect or pass close to the point of intersection for each unit between the drive shaft axis and the head axis.

This structure of transmission demands that the axes of the two drive shafts do not intersect and that the directions of the two drive shafts are such that an axis parallel to one shaft axis intersects the other shaft axis at a right angle or nearly so. This includes a range from 70° to 110°. The advantage gained by the invention is that the two transmissions fit compactly together and that the spacing between the two drive shaft axes need be very little more than that demanded by the dimensions of the bearings necessary to hold the drive shafts in position. Where one tilt head unit, for example the motor, is of non variable tilt angle, the other unit is preferably so located that it occupies a space within or adjacent to the obtuse angle between the drive shaft bearings and the tilt head of the non variable tilt head unit.

Whilst in FIGURES 1, 2 and 3 the common plane through the shaft and tilt head axes of one unit has been set at right angles to the common plane through the drive shaft and tilt head axes of the other unit, the advantage of compactness given by the invention is still attained if a slight variation from this right angle arrangement is used. An example of this arrangement is shown in FIGURE 4. In FIGURE 4 the common plane through the motor shaft and tilt head axes 27 and 28 extends perpendicularly to the plane of the drawing on the line 27–28. Also in this drawing the common plane through the pump drive shaft and tilt head axes 48 and 97 extends perpendicularly to the plane of the drawings on the line 48–97. The inclination between the common planes as shown is about 83°, but it could be any angle between 70° and 110° without loosing the advantage of compactness. In FIGURE 4 the intersection points X and Y of the axes 27, 28 and 48, 97 are also shown and it is clear that these points will be close to the line of intersection of the two common planes.

Whilst the invention has been described with reference to a transmission comprising a variable tilt head pump and a non variable tilt head motor it will be appreciated that the invention is applicable to constructions where either the pump or the motor is variable or non variable.

I claim as my invention:

1. A hydrostatic power transmission comprising a pair of bearing housings, hydraulic pump and motor units which have their drive shafts rotatably mounted in the bearing housings, and which are equipped with tilt heads that are hydraulically interconnected with one another to transmit power between the shafts, said bearing housings being fixed in relation to one another so that a common plane passing through the drive shaft and head axes of one unit intersects a common plane passing through the drive shaft and head axes of the other unit, at an angle within the range of 70° to 110°, the line of intersection between the two planes passing through or close to the point of intersection between the drive shaft axis and the head axis of each unit.

2. A hydrostatic power transmission according to claim 1 wherein the tilt head of at least one unit is adjustable to varying inclinations in relation to the drive shaft of that unit.

3. A hydrostatic power transmission as claimed in claim 1 wherein the tilt head of one unit is mounted so that its axis lies at a fixed inclination to the drive shaft axis of that unit, and the other unit is mounted to extend within the obtuse angle between the drive shaft and head axes of the one unit.

4. A hydrostatic power transmission as claimed in claim 3 including a casing within which the said other tilt head unit and the bearing housing of the said one tilt head unit are mounted, and an extension from the casing forming part of the tilt head of the said one tilt head unit.

5. A hydrostatic power transmission as claimed in claim 4 wherein the extension is detachably connected with the casing.

References Cited by the Examiner

UNITED STATES PATENTS

| 1,817,063 | 8/1931 | Carrie et al. | 60—53 |
| 3,142,964 | 8/1964 | Thoma et al. | 60—53 |
| 3,200,593 | 8/1965 | Kuze | 60—53 |

FOREIGN PATENTS

| 428,383 | 6/1911 | France. |
| 14,135 | 1910 | Great Britain. |

EDGAR W. GEOGHEGAN, *Primary Examiner.*